United States Patent [19]

Haisser

[11] 4,185,396
[45] Jan. 29, 1980

[54] APPARATUS FOR COOLING RUBBER AND PLASTIC EXTRUDATES

[75] Inventor: Alan S. Haisser, Flemington, N.J.

[73] Assignee: Sterling Extruder Corporation, South Plainfield, N.J.

[21] Appl. No.: 874,210

[22] Filed: Feb. 1, 1978

[51] Int. Cl.² .............................................. F26B 17/00
[52] U.S. Cl. ...................................... 34/57 R; 34/13; 165/104 F; 432/197
[58] Field of Search ............ 34/57 R, 13; 165/104 R, 165/104 F; 432/197

[56] References Cited
U.S. PATENT DOCUMENTS

| 3,031,769 | 5/1962 | Wilson | 165/104 F |
| 3,997,288 | 12/1976 | Takaoka et al. | 432/197 |

Primary Examiner—John J. Camby
Attorney, Agent, or Firm—Pennie & Edmonds

[57] ABSTRACT

Rubber and plastic extrudates are passed through a fluidized bed wherein they are simultaneously cooled and supported by gas-cooled, fluidized particles. In a preferred arrangement, the fluidized bed is provided with gas, cooled to a plurality of different temperatures, in order to provide a controlled cooling rate. By this technique, extrudates can be cooled as fast as they can be extruded with minimal thermal degradation, distortion, and marring.

9 Claims, 1 Drawing Figure

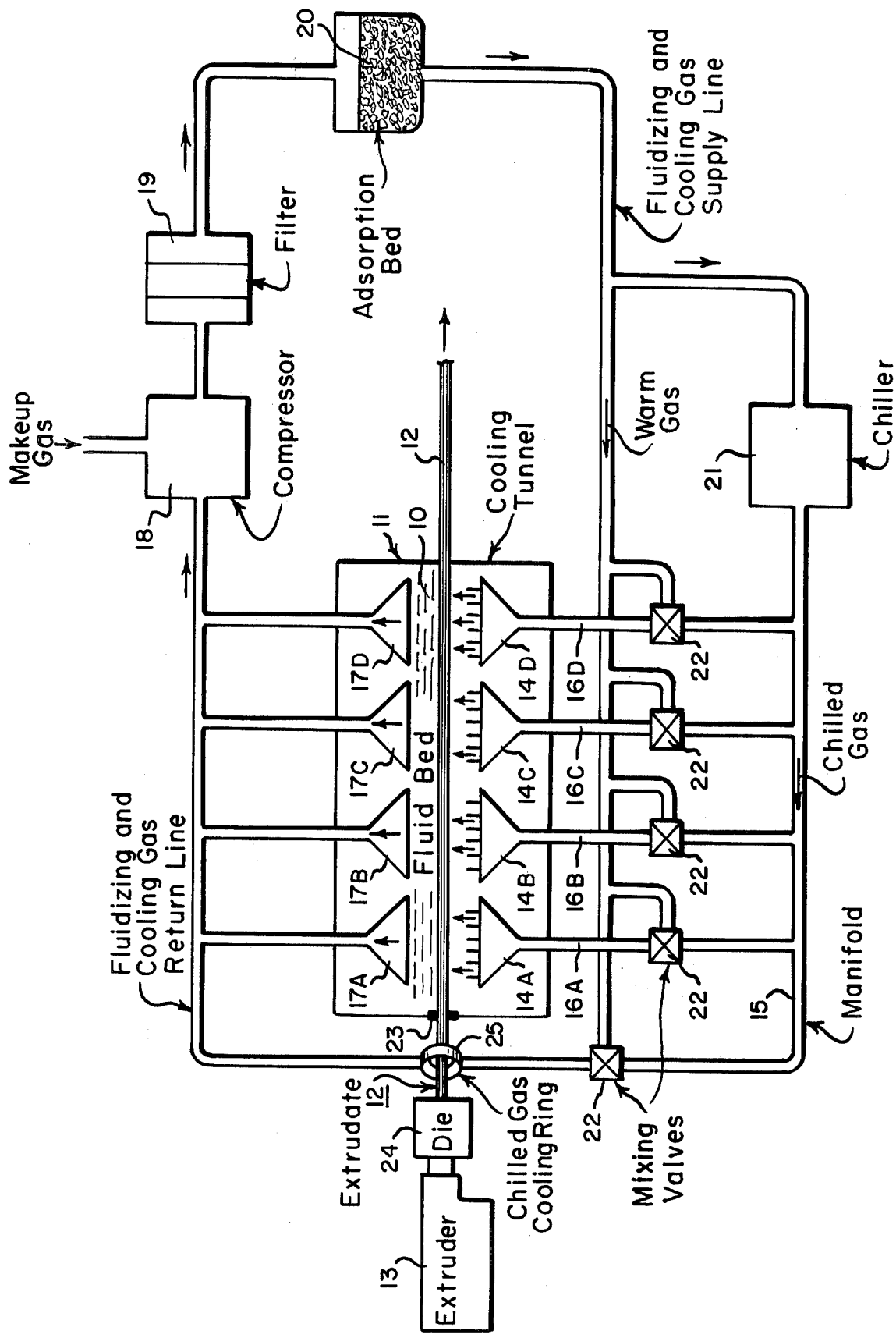

APPARATUS FOR COOLING RUBBER AND PLASTIC EXTRUDATES

BACKGROUND OF THE INVENTION

1. Field of the Invention

This invention relates to apparatus for cooling hot rubber and plastic extrudates using a gas-cooled fluidized bed to cool and to support the extrudate.

2. History of the Art

Extruded products are conventionally cooled by extruding them into a water bath or by forced air currents. Such cooling, however, is typically slow compared to the potential rate of extrusion with the result that the rate of cooling is a major limiting factor in the manufacture of extruded products.

Slow cooling not only limits the rate of manufacture it also permits physical and chemical deterioration of the extruded product and aggravates contamination of the work area. The longer the extrudate maintains an elevated temperature, the greater the thermal degradation of its color, electrical resistivity, and other physical properties, and the greater the effects of oxidative attack. Moreover, hot extrudates often exude hazardous decomposition products such as, for example, vinyl chloride monomer.

In addition, in the conventional cooling of extruded products, the extrudate is typically supported in the cooling station by one or more of a variety of mechanisms, such as plates, belts, jigs or rollers, which often distort or mar substantial portions of the soft extruded product.

SUMMARY OF THE INVENTION

In accordance with the present invention, rubber and plastic extrudates are passed through a fluidized bed wherein they are simultaneously cooled and supported by gas-cooled, fluidized particles. In a preferred arrangement, the fluidized bed is provided with gas, cooled to a plurality of different temperatures, in order to provide a controlled cooling rate. By this technique, extrudates can be cooled as fast as they can be extruded with minimal thermal degradation, distortion, and marring.

BRIEF DESCRIPTION OF THE DRAWINGS

The nature, advantages, and various features of the invention will appear more fully upon consideration of the illustrative embodiments now to be described in detail in connection with the accompanying drawings.

In the drawings:

FIG. 1 is a diagrammatic side-elevational view of apparatus for cooling rubber and plastic extrudates in accordance with the invention.

DETAILED DESCRIPTION OF THE DRAWINGS

Referring to the drawings, FIG. 1 illustrates apparatus for cooling extrudates in accordance with the invention comprising a fluidized bed 10 of small solid particles, such as polyethylene powder, confined within a tunnel 11 through which passes extrudate 12 from extruder 13.

Tunnel 11 is provided with one or more perforated bases 14A, 14B, 14C, and 14D through which chilled gas, such as air or nitrogen, can be supplied from a manifold 15 at a temperature sufficiently low that the fluidized bed cools the passing extrudate and at a velocity or pressure sufficiently high that the bed remains fluidized and that the fluidized bed itself supports the passing extrudate away from the walls of the tunnel. For hollow 1.5 inch diameter polyvinyl chloride extrudates of typical cross section, air at $-20°$ F. at a pressure of 40–50 pounds per square inch produces adequate support in a polyethylene powder bed and adequate cooling in 5–10 seconds.

As illustrated, the tunnel is preferably provided with a plurality of perforated bases 14A, 14B, 14C, and 14D each coupled to respective conduits 16A, 16B, 16C, and 16D for providing gases at controllably different temperatures in order to provide cooling of the extrudate at a controlled rate. Preferably a corresponding plurality of gas exit nozzles 17A, 17B, 17C, and 17D are provided opposite respective bases in order to effectively divide the fluidized bed into a plurality of different temperature zones. This effective division is produced without the use of partition walls by the gases from each base following the paths of least resistance to their corresponding opposite exit nozzles, i.e., the gas from base 16A tends to exit via nozzle 17A, gas from base 16B exits via nozzle 17B, etc.

The preferred cooling gas circuit is a closed one in which gases exiting via nozzles 17A, 17B, 17C and 17D pass through compressor 18, filter 19 to filter out any residual fluidized bed particles, and adsorption bed 20, such as an activated charcoal adsorption bed, to remove any harmful volatile products. The gas is then divided between two return paths to the perforated bases. One path is through chiller 21, wherein the gas is cooled to remove heat imparted by the extrudate and the other return path includes no cooling so that it can be mixed with the cooled gases in desired proportions to provide desired different temperatures at bases 14A, 14B, 14C, and 14D. The precise proportion of cooled and uncooled gases can be controlled by valves 22.

Preferably the gas at the base nearest the extrudate entrance gasket 23 is sufficiently cool, e.g., on the order of $-20°$ F., that it immediately forms a cool, solidified skin on the extrudate. Such a skin minimizes contamination. Subsequent bases can be provided with warmer gas in order to cool and anneal the extrudate without freezing in strains. Where, however, annealing is not necessary, all bases can be provided with gas at the same low temperature.

In the preferred arrangement illustrated, apparatus is provided for blowing chilled gas onto the extrudate between its exit from the extruder die 24 and its entry into the fluidized bed. This can be conveniently accomplished by a hollow cabling ring 25 connected to a source of chilled air and having a plurality of gas spray apertures on its interior circumference for spraying chilled gas onto an extrudate passing therethrough.

The advantages of this cooling technique and apparatus are manifold. The extrudate is cooled in a precise, controlled manner, more rapidly than with conventional cooling processes. It is not distorted or marred by drag over supporting plates or other support mechanisms, and thermal degradation of the extrudate is sharply reduced so that the finished product retains better physical properties. In addition, a non-oxidizing cooling gas can be used to substantially eliminate oxidative attack on the extrudate and a closed cooling gas circuit can be used to prevent hazardous decomposition products from escaping into the plant.

While the invention has been described in connection with only a small number of specific embodiments, it is to be understood that these are merely illustrative of the many other specific embodiments which can also utilize the principles of the invention. Thus numerous and varied devices can be made by those skilled in the art without departing from the spirit and scope of the present invention.

I claim:

1. Apparatus for cooling rubber and plastic extrudates comprising:
    tunnel means through which extrudate from an extruder passes;
    disposed in said tunnel means, a fluidizable bed of small, solid particles;
    means for fluidizing said bed with chilled gas at a sufficiently low temperature as to cool the extrudate and at a sufficient pressure that the fluidized bed supports the passing extrudate away from the walls of said tunnel.

2. Apparatus according to claim 1 wherein said fluidizable bed comprises powdered plastic particles.

3. Apparatus according to claim 1 wherein said means for fluidizing said bed with chilled gas comprises a plurality of means for introducing chilled gas at a plurality of different respective temperatures.

4. Apparatus according to claim 3 wherein the means for introducing chilled gas nearest the extrudate entrance to said tunnel comprises means for introducing gas at the lowest temperature.

5. Apparatus according to claim 1 wherein said gas is a substantially chemically inert gas with respect to said extrudate.

6. Apparatus for cooling rubber and plastic extrudates comprising:
    tunnel means through which extrudate from an extruder passes, said tunnel means including a plurality of gas exit means;
    disposed in said tunnel means; a fluidizable bed of small, solid particles; and
    means for fluidizing said bed with chilled gas at a sufficiently low temperature as to cool the extrudate and at a sufficient pressure that the fluidized bed supports the passing extrudate away from the walls of said tunnel, said means including a plurality of perforated base means located at the bottom portion of said tunnel means for introducing chilled gas at a plurality of different respective temperatures, said plurality of gas exit means being disposed above respective ones of said perforated base means for effectively dividing said fluidizing bed into a plurality of different temperature zones without the use of partition walls.

7. Apparatus for cooling rubber and plastic extrudates comprising:
    tunnel means through which extrudate from an extruder passes;
    disposed in said tunnel means, a fluidizable bed of small, solid particles;
    means for fluidizing said bed with chilled gas at a sufficiently low temperature as to cool the extrudate and at a sufficient pressure that the fluidized bed supports the passing extrudate away from the walls of said tunnel; and
    means for filtering and recirculating the fluidizing gas.

8. Apparatus according to claim 7 including means for rechilling at least a portion of said gas.

9. Apparatus for cooling rubber and plastic extrudates comprising:
    tunnel means through which extrudate from an extruder passes;
    disposed in said tunnel means a fluidizable bed of small, solid particles;
    means for fluidizing said bed with chilled gas at a sufficiently low temperature as to cool the extrudate and at a sufficient pressure that the fluidized bed supports the passing extrudate away from the walls of said tunnel; and
    means for spraying said extrudate with chilled air prior to its entrance into said fluidized bed.

* * * * *